United States Patent [19]

Haneda et al.

[11] Patent Number: 5,257,037
[45] Date of Patent: Oct. 26, 1993

[54] COMPACT IMAGE FORMING APPARATUS WITH COLOR POSITION ADJUSTMENT

[75] Inventors: Satoshi Haneda; Hisao Satoh; Tadayashi Ikeda, all of Hachioji; Shizuo Morita, Tachikawa; Masakazu Fukuchi, Hachioji, all of Japan

[73] Assignee: Konica Corporation, Tokyo, Japan

[21] Appl. No.: 747,324

[22] Filed: Aug. 20, 1991

[30] Foreign Application Priority Data

Aug. 22, 1990 [JP] Japan ................... 2-220723

[51] Int. Cl.$^5$ ............................................ G01D 15/10
[52] U.S. Cl. .................. 346/76 L; 346/108; 346/160; 355/210; 355/326
[58] Field of Search ............... 346/76 L, 157, 108, 346/160; 355/200, 208, 210, 235, 326, 327; 358/75, 78

[56] References Cited

U.S. PATENT DOCUMENTS

| | | | |
|---|---|---|---|
| 4,494,130 | 1/1985 | Kaneko et al. | 364/160 |
| 4,839,692 | 6/1989 | Shoji et al. | 355/327 X |
| 4,959,695 | 9/1990 | Nishimura et al. | 355/326 X |
| 5,025,269 | 6/1991 | Saeki et al. | 346/108 |
| 5,065,195 | 11/1991 | Haneda et al. | 355/210 X |

FOREIGN PATENT DOCUMENTS

0090595 10/1983 European Pat. Off. .
0322219 6/1989 European Pat. Off. .
63-064063 8/1988 Japan .

OTHER PUBLICATIONS

European Search Report, Jan., 1993.

*Primary Examiner*—A. T. Grimley
*Assistant Examiner*—Sandra L. Brasé
*Attorney, Agent, or Firm*—Finnegan, Henderson, Farabow, Garrett & Dunner

[57] ABSTRACT

Color image forming apparatus includes a belt-shaped image carrier stretched and conveyed around rotating rollers on which image exposure is conducted by a plurality of exposure units; and a plurality of step-formed supporting surfaces below the lower surface disposed of the image carrier. The stepped formation of the exposure unit supporting surfaces avoids interference between optical paths of laser beams for image exposure, and facilitates compactness of the apparatus. The belt-shaped image carrier and the supporting surfaces are provided at a relative angle of 5-30 degrees. The color image forming apparatus is also capable of detecting a specific pattern outputted from the exposure units; calculating the differences of positions of the specific pattern as formed by the different exposure units; and controlling the positioning of the specific pattern as outputted by the exposure units, so as to increase the accuracy of the image forming apparatus.

6 Claims, 13 Drawing Sheets

COMPACT IMAGE FORMING APPARATUS WITH COLOR POSITION ADJUSTMENT

BACKGROUND OF THE INVENTION

The present invention relates to a color image forming apparatus in which a toner image is formed on an image forming body by means of electrophotography and the toner image is transferred onto a transfer sheet so that the image can be obtained, and more particularly relates to a color image forming apparatus such as a printer, copier or facsimile in which a plurality of charging means, exposure means and developing means are provided around the image forming body and a color image can be obtained when the image forming body is rotated by one revolution.

A large number of methods and apparatus have been conventionally proposed to form a color image by means of electrophotography. From the viewpoint of the accuracy of the color register and the resolution of the color image, techniques disclosed in the official gazettes of Japanese Patent Publication Open to Public Inspection Nos. 75850/1985, 76766/1985, 95456/1985 are excellent.

According to the aforementioned techniques, a color image can be obtained in such a manner that: a latent image forming process according to the number of separated colors of a document image and a developing process are repeatedly conducted on a drum-shaped image forming body so that toner images of each color can be superimposed on the surface of the aforementioned image forming body; the color toner image then transferred onto a transfer sheet; and the transferred image is fixed. In the aforementioned techniques, only one optical laser device is used for an exposing means to form a latent image in accordance with the number of separated colors, and a color image is formed on the drum-shaped image forming body when it is rotated a plurality of times.

Instead of the drum-shaped image forming body described in the aforementioned official gazettes, a belt-shaped image forming body has been disclosed in the official gazette of Japanese Patent Publication Open to Public Inspection No. 102261/1987, in which a photoconductive material is coated or vapor-deposited on a flexible belt.

The belt-shaped image forming body is provided between rotating rollers including a drive roller, so that space is effectively utilized and the apparatus can be made compact. Accordingly, the belt-shaped image forming body is very effective when a color printer, for example, is designed.

However, in order to form a color image on the belt-shaped image forming body using only one optical laser system provided on the periphery of the belt-shaped image forming body, it is necessary to rotate the aforementioned belt-shaped image forming body a number of times, which increases the time and cost of the copying operation.

In order to solve this conventional problem, a color image forming apparatus can be considered which is characterized in that: a plurality of optical laser units are disposed in parallel below the belt-shaped image forming body; and a color image is formed by one revolution of the belt-shaped image forming body. According to the aforementioned color image forming apparatus, it is not necessary to rotate the belt-shaped image forming body a plurality of times, so that a color image can be formed like that of a black and white image. Consequently, the aforementioned apparatus is advantageous in that: the copying time is shortened; the life of the apparatus is prolonged; and the apparatus can be operated easily.

However, the following problems are caused in the aforementioned color image forming apparatus.

(1) A wide space is necessary to install a plurality of optical laser systems, so that the size of the apparatus becomes large.

(2) In order to form a color image, a high accuracy of color register is required. In the case of the aforementioned apparatus, optical laser systems are dependently provided, so that adjusting operations such as positioning for writing-in timing by scanning light, positioning of each optical laser unit, parallelism of scanning light, and adjustment of scanning width, become very complicated, so that it is actually difficult to conduct adjustment of high accuracy.

In order to form a color image by means of electrophotography, a method has been disclosed in the official gazettes of Japanese Patent Publication Open to Public Inspection Nos. 75850/1985, 76766/1985, 95456/1985, 95458/1985, 158475/1985, wherein a color image can be obtained by a method in which: a latent image forming process according to the number of separated colors of a document image and developing process are repeatedly conducted on a drum-shaped image forming body so that toner images of each color can be superimposed on the surface of the image forming body; the color toner image is transferred onto a transfer sheet; and the transferred image is fixed.

There are two examples of this method. The first example is a color image forming apparatus in which exposing and developing units are provided around the belt-shaped image forming body in accordance with the number of separated colors (for example, three colors of yellow, magenta and cyan, or four colors including black). The second example is a color image forming apparatus in which exposing and developing units are provided around a drum-shaped image forming body in accordance with the number of separated colors. The following are explanations for the first example in which the belt-shaped image forming body is provided.

The color image forming apparatus is composed in such a manner that a belt-shaped image forming body made of a flexible belt on which a photoconductive material is coated or vapor-deposited, encircles a plurality of rollers including a tension roller so that tension can be given. The belt-shaped image forming body is rotated, maintaining slidable contact with a guide member so that the surface of the belt-shaped image forming body can be maintained at a predetermined position. The color image forming apparatus comprises a charger; an exposing unit; and a plurality of developing units, in which color toners of different colors are housed, disposed around the aforementioned belt-shaped image forming body, wherein a predetermined gap is formed between the image forming means and the rotating belt-shaped image forming body.

In the color image forming apparatus, the following method can be considered: a register mark is formed on the image forming body; the aforementioned register mark is detected by a sensor; and exposure operations are sequentially conducted by a plurality of exposing units according to the results of detection so that latent image formation can be started from the same position on the aforementioned image forming body.

In the aforementioned color image forming apparatus, the register mark formed on the surface of the belt-shaped image forming body is read by a single or a plurality of sensors so that the timing to start exposure can be determined. In this manner, it is necessary to accurately set the distance between the sensor and the exposing unit, and the distances between the plurality of exposing units, wherein the accuracy must be ±0.01-0.1 mm. However, when the apparatus is put into practical use, it is hard to maintain the aforementioned accuracy; for example, the accuracy is generally limited to ±0.3-0.5 mm using conventional methods. Further, after the exposing unit has been once removed from the apparatus, it is extremely difficult to position it in exactly the same position.

In the aforementioned color image forming apparatus in which toner images are superimposed on the surface of the image forming body, the following problems are caused: unless the distance between the plurality of exposing units and the aforementioned belt-shaped image forming body is set accurately (i.e., the accuracy is one pixel unit, which typically is not more than 80 μm), the quality of the color toner image is deteriorated. Positioning control in the belt-shaped image forming body is more difficult than that in the drum-shaped image forming body.

SUMMARY OF THE INVENTION

The first object of the present invention is to provide a color image forming apparatus which is made compact by improvements in arrangement and structure of a plurality of optical laser units. The second object of the present invention is to provide a color image forming apparatus which can stably form a clear color image of high resolution.

The third object of the present invention is to provide a color image forming apparatus characterized in that: when a plurality of latent image formations are repeatedly conducted, the deviation of the starting point of exposure can be prevented, even when the plurality of exposing units are not set with complete precision.

The color image forming apparatus of the present invention is composed in such a manner that: a belt-shaped image forming body is wrapped around rotating rollers; image exposure is conducted on the belt-shaped image forming body by a plurality of optical laser units, wherein the aforementioned plurality of optical laser units are disposed on a plurality of step-like supporting surfaces in parallel with each other.

The color image forming apparatus of the present invention can be applied to a color copier provided with a color scanner, wherein the color scanner outputs color image signal A to writing-in unit B including an optical laser system in such a manner that: image information obtained by scanning a document image is color-separated by a color separation unit into B (blue), G (green) and R (red); the obtained color-separation information is photoelectrically converted and processed; and color image signals A of Y (yellow), M (magenta), C (cyan) and BK (black) are outputted to writing-in unit B. Alternatively, the color image forming apparatus of the present invention may be applied to a color printer in which the aforementioned color scanner is not provided and which is operated by an external image forming signal such as from a microcomputer or a facsimile.

In the color image forming apparatus of the present invention, the first set of image forming means having a charger for Y-toner image formation and a developing unit including Y-toner, the second set of image forming means to form an M-toner image, the third set of image forming means to form a C-toner image, and the fourth set of image forming means to form a BK-toner image, are installed in parallel with each other below the lower surface of the belt-shaped image forming body provided between a drive roller and an idle roller in order to form a toner image of each color at each revolution of the aforementioned image forming body. While a conventional laser unit is disposed vertically, each optical laser unit is disposed horizontally in this structure, wherein the optical laser units are installed on the step-like supporting surfaces in parallel with each other so that the laser beams emitted from each optical laser system can not interfere with each other.

The aforementioned optical laser device and support surface are preferably integrated into one unit so that a detachable optical unit can be formed, which can be easily attached to and detached from the apparatus body for maintenance or renewal.

When the apparatus is structured in the manner mentioned above, before the aforementioned optical unit is assembled into the apparatus body, each optical laser device can be precisely set onto the support surface so that conditions such as writing-in timing, parallelism of beams and beam width can be satisfied.

When the aforementioned optical laser device is replaced, it is not necessary to reset the positioning of each optical system, the parallelism of scanning beams and the scanning width. All the operator has to do is to set a new standard unit.

The optical device in the aforementioned optical unit is detachably engaged with a groove on the support surface and pushed by a spring so that it can be closely contacted with the support surface. When necessary, the optical device is replaced.

The aforementioned optical devices preferably meet the same requirement so that they can be interchangeable.

In order to avoid interference between the optical paths of the laser beams for image exposure, the optical unit including the optical laser device is preferably installed at an angle of 5°-30°, and more preferably at an angle of 10°-20°, with regard to the lower surface of the belt-shaped image forming body. In the manner described above, a plurality of optical laser devices can be effectively assembled into a small space in the apparatus body.

It is preferable that the aforementioned belt-shaped image forming body, the plurality of developing units, the charger and the cleaning unit are integrally formed into one unit so that they can be integrally attached to and detached from the apparatus body.

Paper conveyance system is composed of a paper feed cassette, a paper feed roller and a paper conveyance passage. In order to make the apparatus compact, it is preferable that the aforementioned paper feed cassette and paper feed roller are provided below the aforementioned optical unit and the paper conveyance passage is provided on the side of the aforementioned optical unit.

In order to accomplish the aforementioned object, the present invention includes a color image forming apparatus of another structure, in which image forming means including a plurality of exposing units are provided around a moving image forming body, and which comprises: a detecting means which detects a specific pattern outputted from the aforementioned exposing unit; an operation means which conducts an operation to find the difference of positions of the specific pattern detected by the aforementioned detecting means between the exposure units; and a control means which controls the position of the aforementioned exposing unit according to the difference of position computed by the aforementioned operation means.

An image reading system comprising the color image forming apparatus is preferably used for the detecting means of the specific pattern.

DESCRIPTION OF THE PREFERRED EMBODIMENTS

Embodiments of the present invention will be explained specifically as follows.

Figure 1:
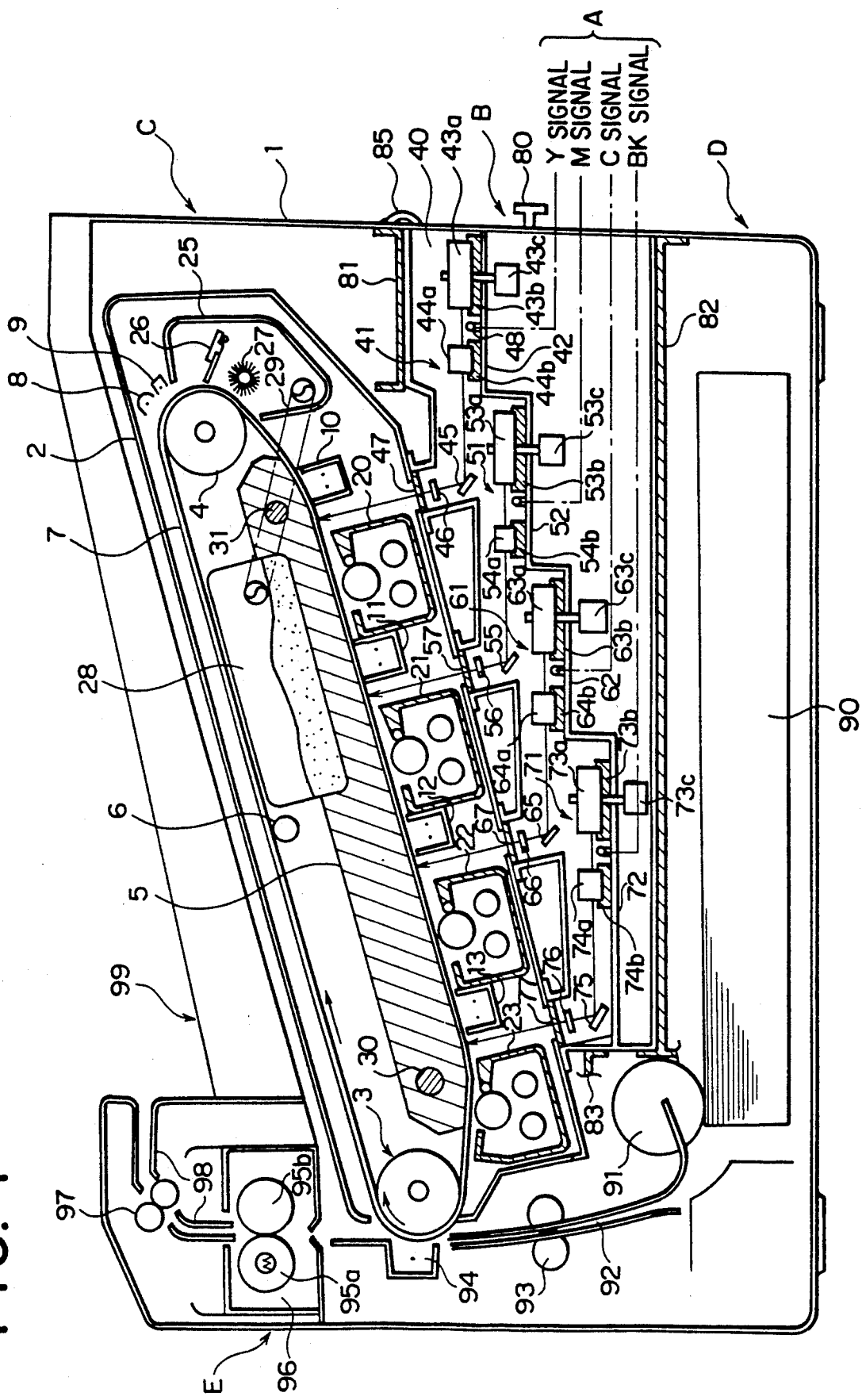
FIG. 1 is a sectional view of the color printer of the present invention.
Figure 2:
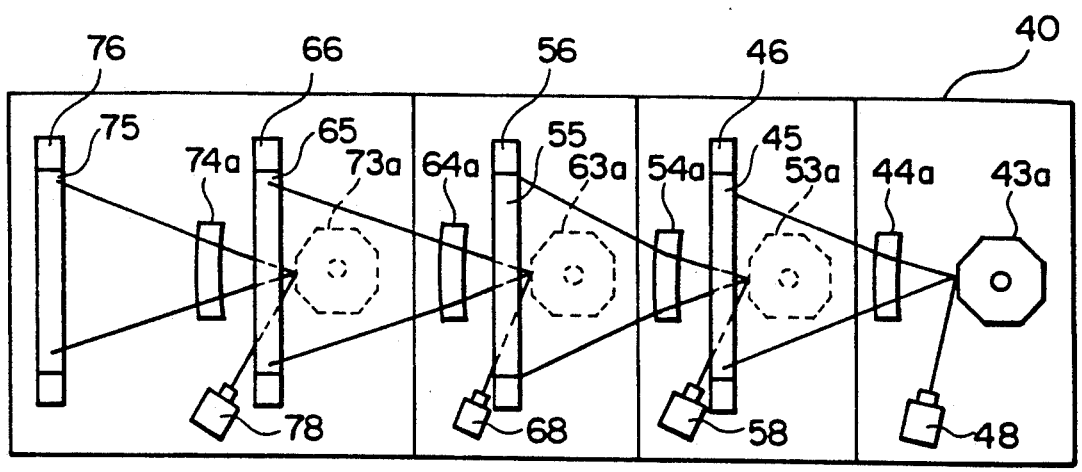
FIG. 2 is a plan view showing the arrangement of each optical laser device of FIG. 1.
Figure 3:
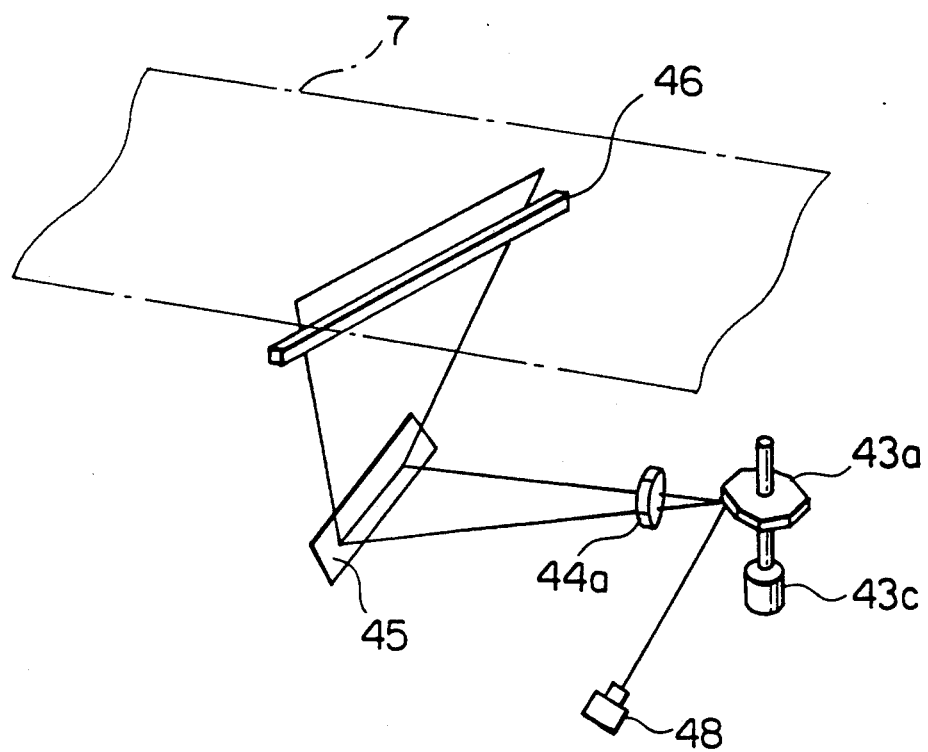
FIG. 3 is a perspective view showing a Y-optical laser device.
Figure 4:
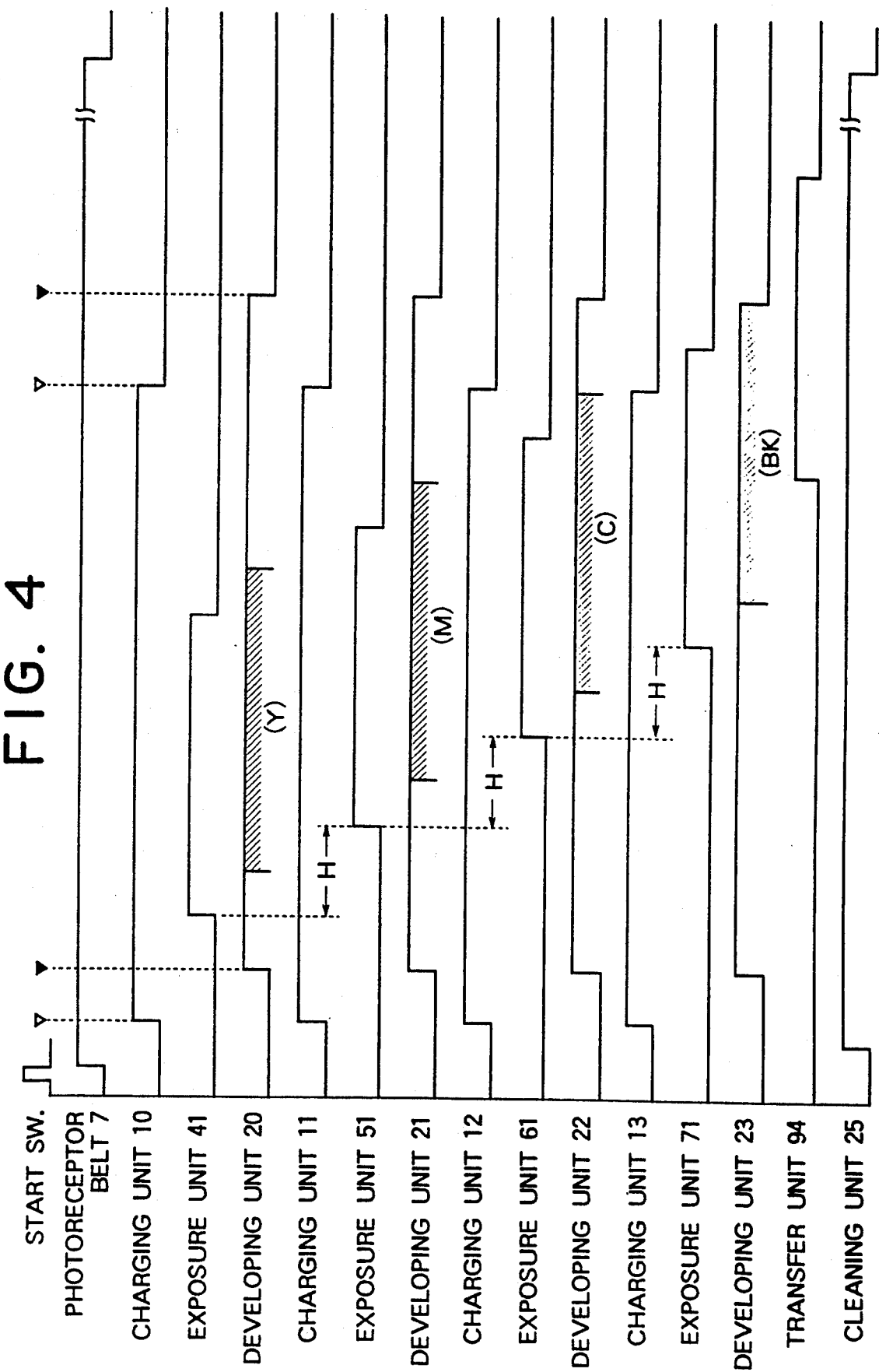
FIG. 4 is a time chart of the image forming process.

FIG. 1 to FIG. 5 are views to explain the embodiment of the present invention. FIG. 1 is a sectional view showing a color printer of the embodiment, FIG. 2 is a plan view showing an optical unit in FIG. 1, FIG. 3 is a perspective view of a Y-optical device in the optical unit, and FIG. 4 is a time chart of image formation.

The aforementioned color printer shown in FIG. 1 is composed of writing system B to conduct image exposure on a photoreceptor according to external signal A, image forming system C, paper feeding system D, and paper discharging system E including a fixing unit.

The aforementioned image forming system C comprises a photoreceptor unit 2 which is detachably provided to the apparatus body 1, wherein the photoreceptor unit 2 can be detached from the apparatus body upward in FIG. 1. The aforementioned photoreceptor unit comprises: a belt shaped image carrying member, i.e. photoreceptor 7, which is provided between a drive roller 3 on the transfer side and an idle roller 4 on the cleaning side, and which is guided by a guide plate 5 provided on the tension side and a guide roller 6 provided on the loose side; chargers 10, 11, 12 of Y, M, C which are provided below the photoreceptor 7; developing units 20, 21, 22, 23 of Y, M, C, BK; a pre-cleaning exposure lamp 8; a discharger 9; and a cleaning unit 25, wherein they are integrally provided in the photoreceptor unit.

The aforementioned cleaning unit 25 includes a cleaning blade 26 and a cleaning brush 27 for removing toner which remains on the photoreceptor surface while the blade is separated from the surface. A screw conveyor 29 is also provided which conveys the toner scraped off by the aforementioned blade 26 and brush 27 to a used toner recovery chamber 28 installed between the drive roller 3 and the idle roller 4 in the photoreceptor unit 2. The aforementioned photoreceptor unit 2 is attached to and detached from the apparatus body in such a manner that: the photoreceptor unit 2 is guided by guide rods 30, 31, one end of which is supported by the apparatus body, which penetrate the aforementioned guide plate 5 used to guide the belt-shaped photoreceptor.

An optical unit 40 is horizontally disposed below the aforementioned photoreceptor unit 2, wherein the optical unit 40 is detachably provided on the right side in the drawing. The optical unit 40 is composed in such a manner that plurality of exposure means, such as; optical devices 41, 51, 61, 71 of Y, M, C, BK having the same structure, are laterally disposed on horizontal step-like support surfaces 42, 52, 62, 72, so that image exposure can be accurately conducted on the photoreceptor in sequence being timed to the image formation.

In order to conduct image exposure described above, the photoreceptor unit and the lower surface of the belt-shaped photoreceptor are inclined by an angle of between 5° and 30° with regard to the aforementioned optical unit 40 which is horizontally installed. Preferably an angle of 10°–20°, such as 15°, is utilized.

The Y-optical device 41 in the aforementioned optical unit 40 comprises: a polygonal mirror 43a, a support stand 43b of the polygonal mirror 43a, a high speed motor 43c, an f-θ lens 44a, a support stand 44b of the lens 44a, a mirror 45, a cylindrical lens 46, a dust protective glass 47, and a semi-conductor laser unit 48. In the same manner as described above, an M-optical device 51, C-optical device 61, and BK-optical device 71 comprise: polygonal mirrors 53a, 63a, 73a, support stands 53b, 63b, 73b, motors 53c, 63c, 73c, f-θ lens 54a, 64a, 74a, support stands 54b, 64b, 74b, mirrors 55, 65, 75, cylindrical lens 56, 66, 76, dust protective glass 57, 67, 77, and semi-conductor laser units 58, 68, 78, respectively.

The aforementioned optical unit 40 is detached from the apparatus body 1 being guided by an upper guide 81 and lower guide 82, wherein a handle 80 is pulled by an operator. When the optical unit 40 is attached to the apparatus body 1, it is inserted into the apparatus body 1 until the tip of the optical unit 40 comes into contact with a stopper 83.

FIG. 2 which is a plan view of each optical device in the optical unit 40 and FIG. 3 which is a perspective view of the Y-optical device are provided to help a viewer to understand the structure of the aforementioned optical unit. Fine adjustment of parallelism of the image exposure scanning can be conducted by the mirrors 45, 55, 65, 75.

Paper feeding system D is provided below the aforementioned optical unit and on the left side in the drawing. Paper feeding system D includes a paper feeding cassette 90, paper feeding roller 91, transfer paper conveyance passage 92, conveyance roller 93, and transfer electrode 94.

Paper discharging system E is provided in the upper position of the aforementioned transfer paper conveyance passage. Paper discharging system E comprises a fixing unit 96 including fixing rollers 95a, 95b, a paper discharging roller 97, a paper discharging passage 98, and a paper discharging tray 99.

Referring to FIG. 1 and FIG. 4, the image forming process of this embodiment in which the aforementioned color printer is used, will be explained as follows.

First, when start switch SW is turned on, the belt-shaped photoreceptor 7 is conveyed in the direction of an arrow at a predetermined peripheral speed V. The charging units 10, 11, 12, 13 are simultaneously turned on in the first timing so that a uniform electrical charge is given on the surface of the aforementioned photoreceptor. Then, the developing units 20, 21, 22, 23 are simultaneously turned on in the second timing. Right after that, a Y-image exposure is conducted by a semiconductor laser beam through the Y-laser optical device 41 according to a Y-signal so that a latent image is formed on the photoreceptor, and then the Y-toner image is formed by the Y-developing unit 20. The photoreceptor on which the toner image is carried, passes over the M-charging unit 11, and is charged again. In this case, the distance between the image exposure positions on the surface of the photoreceptor is defined as H.

An M-image exposure is conducted by the optical device 51 according to an M-signal at a predetermined time, H/V seconds, later than the previous Y-image exposure, and an electrostatic latent image is formed on the same region on the photoreceptor as the aforementioned Y-toner image, and then the electrostatic latent image is developed by the M-developing unit 21 so that the M-toner image is formed on the aforementioned Y-toner image. After that, the photoreceptor is charged again by the charging unit 12, and then a C-image exposure is conducted on the surface of the photoreceptor by the optical device 61 according to a C-signal H/V seconds later than the previous M-image exposure so that an electrostatic latent image is formed. The electrostatic latent image is developed by the C-developing unit 22, and a C-toner image is formed on the aforementioned Y-toner image and M-toner image. In the same manner as described above, a BK-image exposure is conducted by the optical device 71 according to a BK signal, and an obtained latent image is developed by the BK developing unit 23 so that a BK-toner image can be superimposed on the toner images previously formed. A DC bias, the potential of which is slightly lower than the charging potential on the photoreceptor, and an AC bias are impressed upon the sleeves of the developing units 20, 21, 22, 23. Then, the toner image is developed by means of a non-contact reversal development system using a two-component type of developer suitable for color development, and a dot-shaped color toner image is formed.

The color toner image formed on the surface of the belt-shaped photoreceptor is transferred onto the surface of a transfer sheet which has been conveyed in the manner described later, by the action of a transfer electrode. In this process, the transfer sheet is fed from a paper feeding cassette 90 by a paper feeding roller 91, and conveyed by a conveyance roller 93 through a conveyance passage 92 so that the conveyance of the transfer sheet can be timed to the image formation. The image transferred onto the transfer paper is thermally fixed by a thermal roller 95a and a press roller 95b provided in a fixing unit 96 so that a thermally fixed color image is formed. The transfer sheet onto which the color image has been transferred is conveyed by a discharging roller 98 through a discharging passage 98 and discharged onto a discharging tray 99.

The timing of the aforementioned image formation is shown on the timing chart in FIG. 4. After transfer, the surface of the photoreceptor is by the blade 26 and cleaning brush 27 of the cleaning unit 25 in order to prepare for the following image formation. The cleaning blade and cleaning brush 27 are turned on right after the printer has been started, and turned off after the color image has been formed, wherein the aforementioned cleaning brush 27 is turned on later than the aforementioned cleaning blade.

The inventors repeated the aforementioned image forming process using the aforementioned color printer, and made 100,000 prints. In the middle of the printing operation, the quality of images and accuracy of image superimposition were deteriorated due to the fatigue of the carrier in the developer and the photoreceptor, so that the photoreceptor unit was renewed when 50,000 prints were made. When 100,000 prints were made, consideration was given to the deterioration of accuracy of superimposition, and the optical laser unit 40 was replaced. When the optical laser unit was replaced, the aforementioned optical laser unit was pulled out to the right in the drawing by a handle 80, and a new unit of the completely same structure was set and fixed to the apparatus with a lock spring 85, and then the next image formation was conducted. Images of high quality were obtained while adjusting operations of the optical devices 41, 51, 61, 71, were not necessary, and further adjusting operations of parallelism of the laser beams and scanning width were not necessary, either.

In this embodiment, the present invention was applied to a color printer. However, the present invention may be applied to a color copier in which a color scanner is provided to the upper portion of the color printer.

Then, referring to the attached drawings, another embodiment will be explained as follows.

Figure 5:
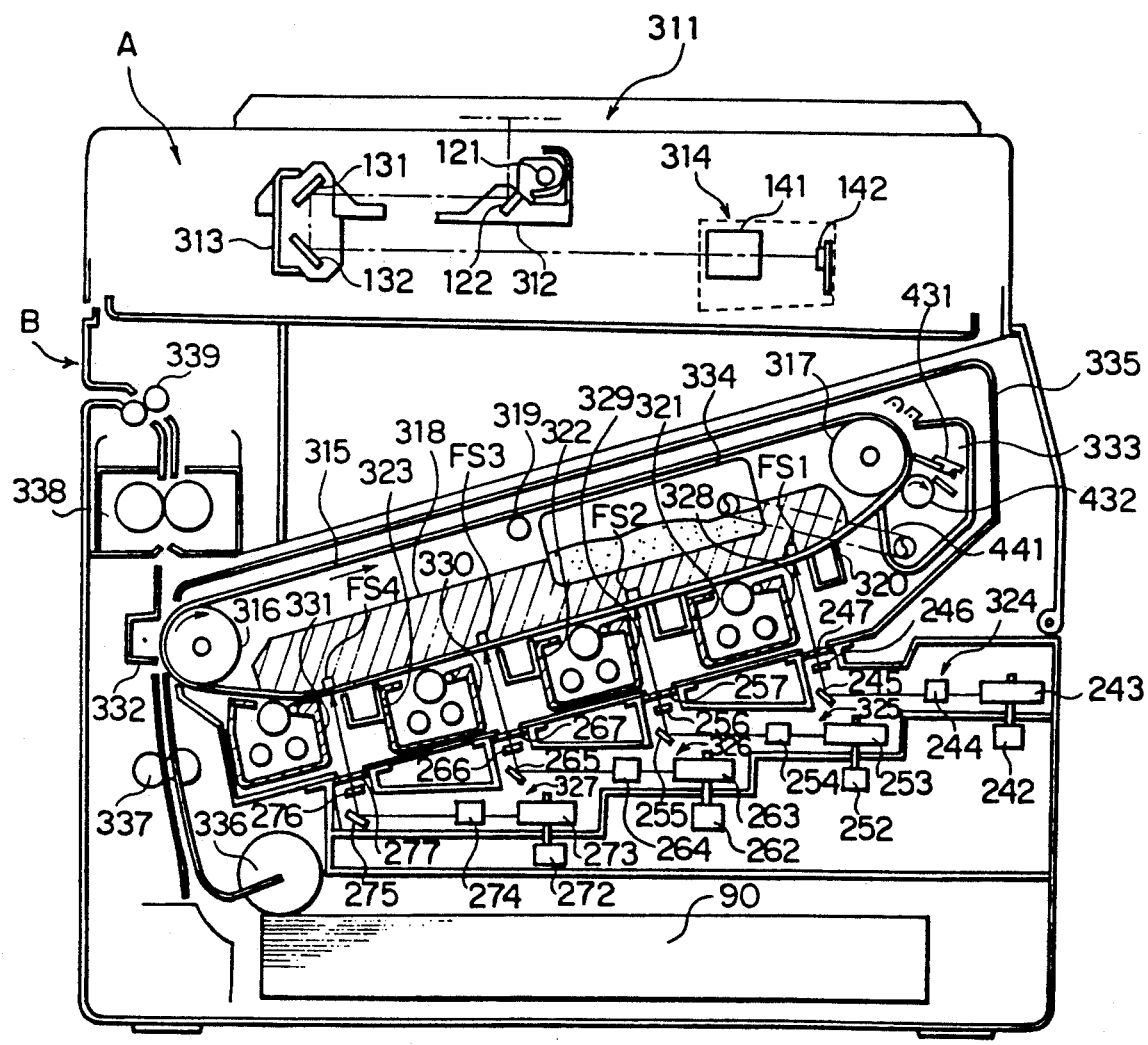
FIG. 5 is a sectional view showing the structure of the main portion of a color copier.

FIG. 5 is a sectional view showing the main portion of a color copier which is a color image forming apparatus having a belt-shaped image forming body of an embodiment of the present invention. This color copier comprises image reading system A and image forming system B. Image forming system B of the color image forming apparatus of the embodiment is composed as follows: an image forming means including a plurality of charging means, a plurality of exposing means, and a developing means loaded with four different color toners, is provided around a belt-shaped image forming body. When the belt-shaped image forming body is rotated by one revolution, images of yellow, magenta, cyan and black are superimposed so that a color image can be formed.

Referring to FIG. 5 which is a view showing the main structure of the color copier, reading system A will be explained as follows.

In reading system A, a document placed on a platen 311 is illuminated by a halogen lamp 121 mounted on a carriage 312 which slides horizontally. A movable mirror unit 313 is composed of mirrors 131, 132, and also slides horizontally. The movable mirror unit 313 leads an optical image of the document to a lens reading-out section 314 in combination with a mirror 122 mounted on the aforementioned carriage 312.

The aforementioned carriage 312 and movable mirror unit 313 are driven by a wire (not shown in the drawing) which is connected with a stepping motor (not shown in the drawing). The carriage 312 is slid at a speed of V, and the movable mirror unit 313 is slid at a speed of ½V, wherein both of them are slid in the same direction.

The aforementioned lens reading-out section 314 is provided with a lens 141 and a color CCD142 which is installed in an image forming position behind the lens 141. The document image is color-separated into blue image data (BL), green image data (G), and red image data (R) by the CCD142, and the obtained data is outputted to an image processing means 350.

Figure 6:
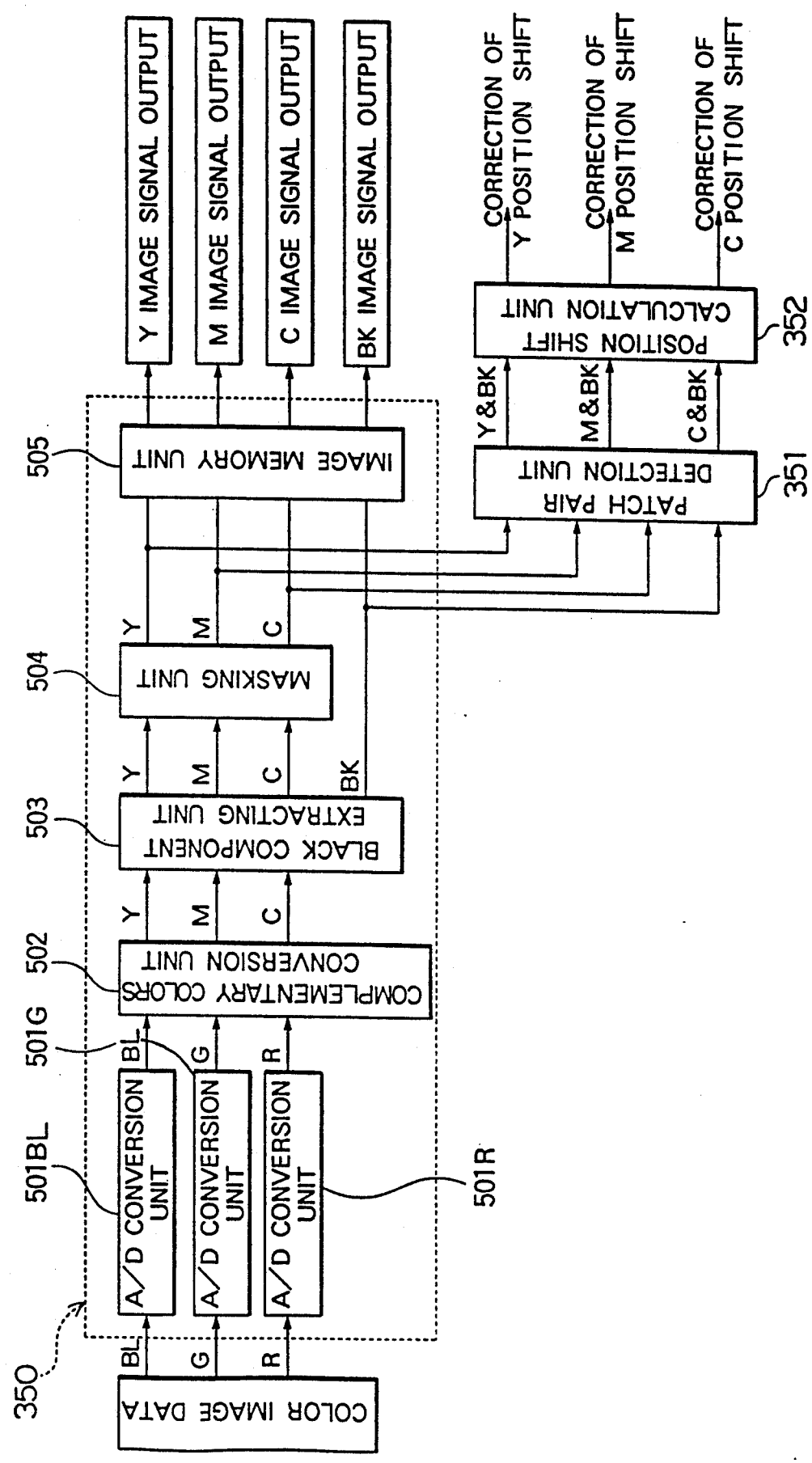
FIG. 6 is a block diagram showing the means of image processing.

As shown in FIG. 6, the image processing means 350 is composed of an A/D converting sections 501BL, 501G, 501R, a complimentary color converting section 502, a black component extracting section 503, a masking section 504, and an image memory section 505.

The A/D converting sections 501BL, 501G, 501R convert color data composed of blue (BL), green (G) and red(R) data or monochrome image data (BK) into image data of digital signals having 256 gradations, and then the converted data is outputted to a complimentary color converting section 502 which will be described later.

The complimentary color converting section 502 converts the digital signal of the color data which has been converted by the A/D converting section 501, into image data of yellow (Y), magenta (M), and cyan (C).

When the processing of under color removal (which will be referred to as UCR, hereinafter) is conducted, in the black component extracting section 503, image data of black (BK) can be extracted from the image data of Y, M, C obtained in the complimentary color converting section 502.

A masking section 504 color-corrects the image data of Y, M, C after UCR.

An image memory section 505 stores the color image data composed of the image data of Y, M, C which has been color-corrected in the masking section 504, and the image data of BK which has been extracted in the black component extracting section 503.

After the image data has gone through the processing of complimentary color correction, black component extraction and color correction by the image processing means 350, the image signal of yellow (Y) that is the first color, the image signal of magenta (M) that is the second color, the image signal of cyan (C) that is the third color, and the image signal of black (BK) that is the fourth color are respectively outputted into a laser writing systems 324–327 that are exposing means described later.

Referring now to FIG. 5 which shows the main structure of the color copier, FIG. 7 which is a perspective view of the photoreceptor belt and FIG. 8 which shows the arrangement of the laser writing unit, image forming system B will be explained as follows.

A belt-shaped image forming body 315 is provided in the apparatus in such a manner that: a guide member 318 having a radius of curvature is provided between rotating rollers 316, 317; the belt-shaped photoreceptor 315 (which will be referred to as a photoreceptor belt, hereinafter) is stretched between the rotating rollers 316, 317, wherein the photoreceptor belt is made of a flexible belt on which a photoconductive material is coated or vapor-deposited; and a tension is given to the aforementioned photoreceptor belt 315 so that the photoreceptor belt 315 can be rotated maintaining a slidable contact with the guide member 315. In the manner described above, while the photoreceptor belt 315 is rotated, the surface of the photoreceptor belt 315 can be maintained in a constant position with regard to the outer peripheral surface of the guide member 318. Since the photoreceptor belt 315 is provided in such a manner that an image forming surface of a large radius of curvature is stably formed on the photoreceptor belt 315, a large number of image forming means having the same structure can be disposed in parallel at a constant interval. Further, the distance between an exposure means and the photoreceptor belt 315, and that between a developing means and the photoreceptor belt 315 can be maintained constant by the guide member 318, so that images of high quality can be stably formed.

Figure 7:
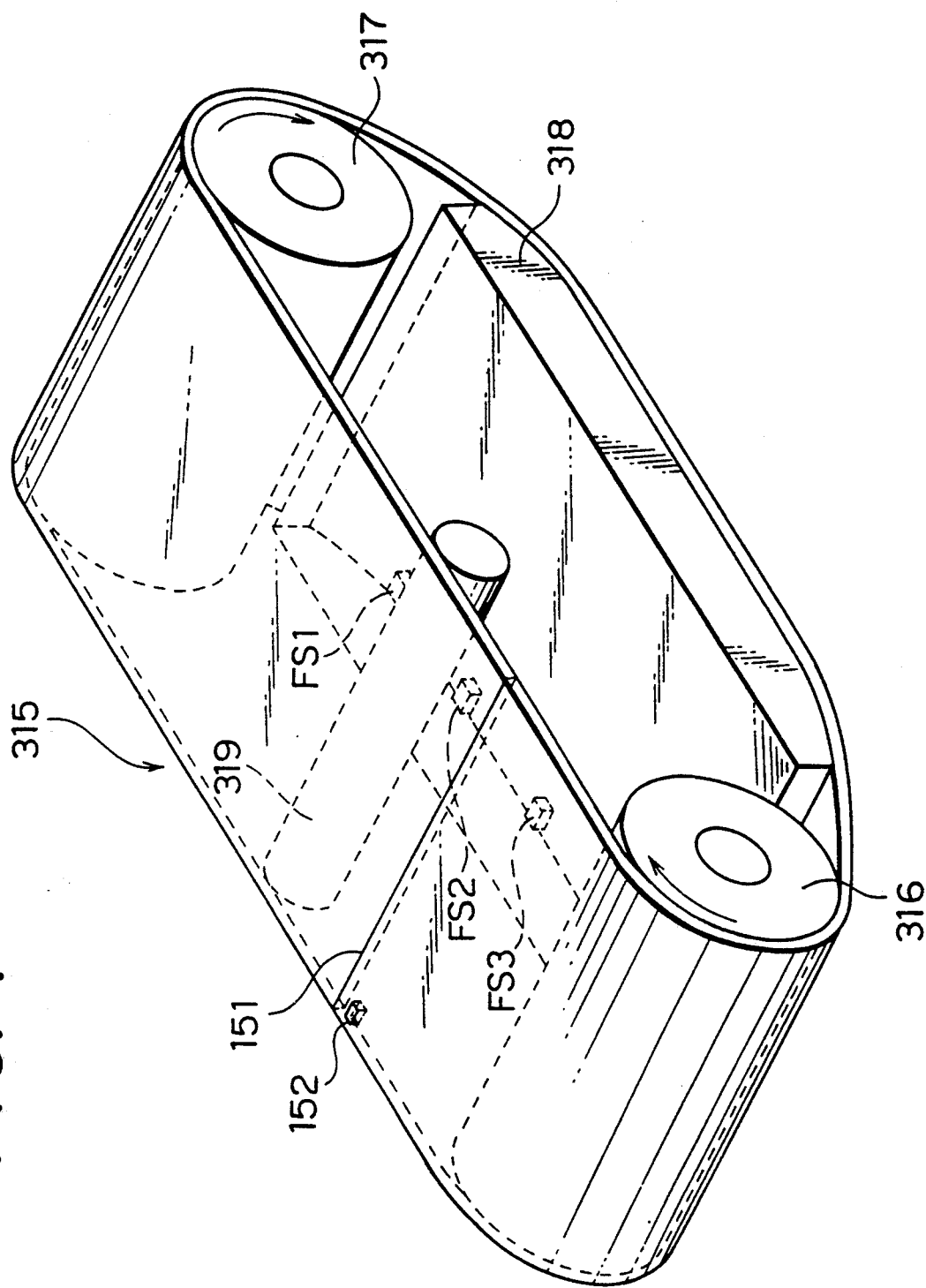
FIG. 7 is a perspective view of a photoreceptor belt.
Figure 8:
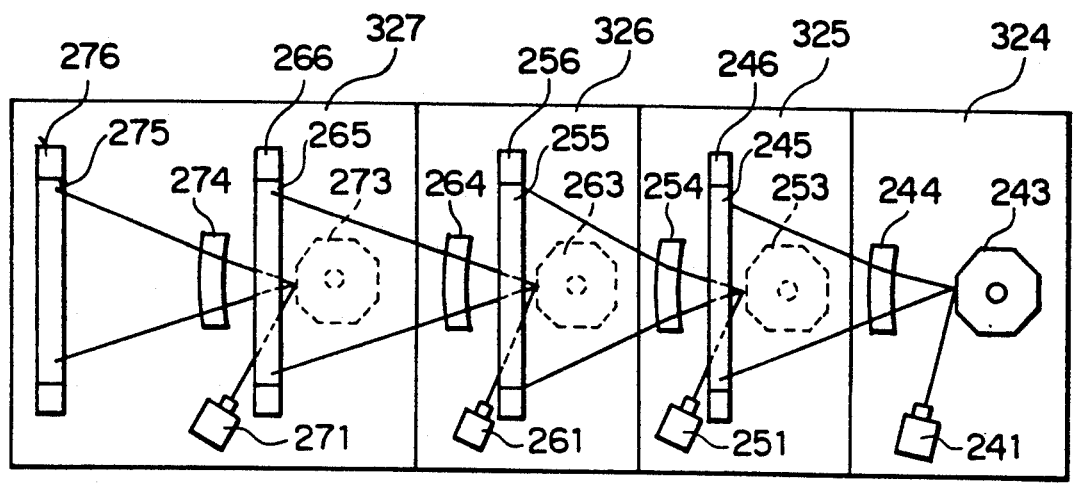
FIG. 8 is a schematic illustration showing the arrangement of a laser writing unit.

As illustrated in FIG. 7, a register mark 152, which is either a through hole, or a through hole on which a light transmitting film is adhered so that a laser beam can transmit, is formed in a position located at a predetermined distance from a joint portion 151 of the photoreceptor belt 315, wherein the aforementioned position is located on the upstream side of the primary scanning direction. In order to detect the joint portion of the photoreceptor belt, the register mark 152 is detected by a photo-sensor which will be described later, so that the starting positions of the primary and auxiliary scanning can be determined. As illustrated in FIG. 7, cut-out portions are formed in both edge portions of the guide member 318 so that photo-sensors FS1–FS4, which are light detecting means, can be provided inside the cut-out portions. Exposure light sent from the exposure unit passing through the register mark 152, is detected by photo-sensors FS1–FS4. Instead of the through hole, a reflecting member may be provided on the surface of the photoreceptor belt 315 so that the reflected light can be detected by the photo-sensor.

In this embodiment, the photoreceptor belt 315 is used for an image forming body. However, it should be understood that the present invention is not limited to the specific embodiments, and the present invention can be applied to a conventional image forming body such as a drum-shaped photoreceptor.

A plurality of charging means, a plurality of exposure means, a developing means loaded with four different color toners, a transfer means, and a cleaning means are provided around the photoreceptor belt 315.

The charging means is provided for uniformly charging the photosensitive layer on the surface of the photoreceptor belt 315 to a predetermined polarity. A conventional charging unit 320–323 such as a corona charger and a scorotron charger is used for the charging means.

The exposure means includes semi-conductor laser writing system units 324–327 by which the surface of the photoreceptor belt 315 charged by the charging units 320–323 is exposed so that an electrostatic latent image can be formed.

The developing means includes four developing units 328–331 which have been loaded with toners (developers) of different four colors, for example, yellow (Y), magenta (M), cyan (C) and black (BK). These developing units 328–331 have the function that an electrostatic latent image on the photoreceptor belt 315 can be visualized by means of a non-contact developing method. This non-contact developing method is different from a contact-developing method in such a manner that: a toner image previously formed on the photoreceptor belt 315 is not damaged by the non-contact developing method; the movement of the photoreceptor belt is not blocked. Consequently, color images of high quality can be obtained by the non-contact developing method.

The transfer means, that is a transfer unit 332 such as a corona discharger, transfers a toner image formed on the photoreceptor belt 315 onto the surface of a transfer sheet. Instead of the transfer unit 324, a conventional transfer member such as a transfer drum may be used.

The cleaning means 333 is provided with a cleaning blade 431 and cleaning roller 432. When cleaning is conducted, the cleaning means 333 comes into contact with the surface of the photoreceptor belt 315 with pressure so that the surface of the photoreceptor belt 315 can be cleaned A recovery box 334 holds the toner which has been recovered from the surface of the photoreceptor belt 315 through a recovery pipe 441.

In this embodiment, the aforementioned photoreceptor belt 315, charging units 320–323, developing units 328–331 loaded with toner of each color, cleaning means 333, and toner recovery box 334 are integrally provided in a one-body cartridge 335, so that the aforementioned means can be integrally attached to or detached from the apparatus body.

The color image forming process conducted by image forming system B having the aforementioned structure is as follows.

First, the image signal of the first color outputted from image reading system A is inputted into the aforementioned laser writing system unit 324, and then a laser beam is generated by a semiconductor laser 241 in the laser writing system unit 324. The generated laser beam is scanned by a polygonal mirror 243 rotated by a motor 242, and passes through an f-θ lens 244, mirror 245, cylindrical lens 246 and protective glass 247. Then the laser beam is projected on the peripheral surface of the photoreceptor belt 315 which has been uniformly charged by a charging unit 320 so that a bright line can be formed.

Concerning the auxiliary scanning direction, photo-sensor FS1 detects a register mark 152 which corresponds to a specific position on the photoreceptor belt 315. This detection signal is used for reference, and the position of the primary scanning line is determined at which the modulation of the semiconductor laser 241 is started according to the image signal. When scanning has been started, the laser beam in the primary scanning direction is detected by photo-sensor FS1. The detected signal is used for reference, and the modulation of the semiconductor laser 241 is started according to the image signal of the first color. The modulated laser beam scans the surface of the photoreceptor belt 315. Accordingly, a latent image corresponding to the first color is formed on the surface of the photoreceptor belt 315 which has been uniformly charged according to the primary scanning conducted by the laser beam and the auxiliary scanning conducted by the movement of the photoreceptor belt 315. This latent image is developed by a developing unit 328 loaded with yellow toner so that a yellow toner image is formed on the surface of the photoreceptor belt 315. After that, the photoreceptor belt 315 on which the yellow toner image has been formed, is rotated, and the image formation of the second color starts.

In the same manner as the aforementioned image signal of the first color, when the photoreceptor belt 315 having a yellow toner image on its surface, has come to the position of the next charging unit 321, the photoreceptor belt 315 is charged again by the charging unit 321, and then photo-sensor FS2 detects a register mark 152 corresponding to a specific position on the photoreceptor belt 315. This detection signal is used for reference, and the modulation of a semiconductor laser of a laser writing system unit 325 starts according to the image signal of the second color. The laser beam which has been generated by the semiconductor laser 251 of the laser writing system unit 325, is scanned by a polygonal mirror 253 rotated by a motor 252, and passes through an f-θ lens 254, mirror 255, cylindrical lens 256 and protective glass 257. Then the laser beam is projected on the peripheral surface of the photoreceptor belt 315 which has been uniformly charged by a charging unit 321 so that a bright line can be formed. The formed latent image is developed by a developing unit 329 loaded with magenta toner of the second color. The magenta toner image is formed on the surface of the photoreceptor belt under the presence of the yellow toner image which has already been formed.

In the same manner as described above, the photoreceptor belt 315 on which the yellow toner image of the first color and the magenta toner image of the second color have already been formed, is further rotated and uniformly charged by a charging unit 322. Then, a latent image is formed by a laser writing unit 326, and the latent image is developed by a developing unit 330 loaded with cyan toner so that a cyan toner image is formed. The photoreceptor belt 315 on which the toner image of cyan of the third color has been formed, is further rotated, and in the same manner as the aforementioned second and third color, the photoreceptor belt 315 is uniformly charged by a charging unit 323. Then, a latent image is formed by a laser writing system unit 327, and developed by a developing unit 331 loaded with black toner so that a black toner image is superimposed on the images previously formed. In the manner described above, a color toner image is formed on the surface of the photoreceptor belt 315. That is, while the photoreceptor belt 315 is rotated by one revolution, a color toner image can be formed.

A DC or further AC bias is impressed upon the developing units 328–331. Since the basic frame of the photoreceptor belt 315 is grounded, a non-contact reversal development (a jumping development) is conducted. Either one-component developer or two-component developer can be utilized for this non-contact development. In the case where one-component developer is used, it is not necessary to provide toner concentration control means, so that the apparatus can be made compact. However, from the viewpoint of the stability of development, the developing method in which two-component developer is used is superior to the method in which one-component developer is used.

The color toner image formed on the surface of the photoreceptor belt 315, is transferred onto the surface of a transfer sheet which is conveyed in such a manner that: the transfer sheet is sent from a paper feeding cassette 90 by a paper feeding roller 336; an then the transfer sheet is conveyed by a timing roller 337 being timed to the aforementioned color toner image on the photoreceptor belt 315. A high electric potential of an inverse polarity is impressed upon the transfer unit 332 so that transfer is conducted.

The transfer sheet onto which the color toner image is transferred, is positively separated from the photoreceptor belt 315 which is sharply curved by a drive roller 316, and then the color toner image is fixed by a fixing means 338. After that, the transfer sheet is discharged by a discharging roller 339 to the outside of the apparatus.

After the color toner image has been transferred onto the transfer sheet, the photoreceptor belt 315 is further rotated clockwise, and the residual toner on the surface of the photoreceptor belt 315 is removed and cleaned by a cleaning means 333 including a cleaning blade 431 and cleaning roller 432, wherein the cleaning blade 431 and cleaning roller 432 are contacted with the photoreceptor belt with pressure. After cleaning, a new image forming process starts.

Next, a positional adjustment by which color slip can be avoided will be explained.

The positional adjustment in this embodiment is conducted in such a manner that: an image signal of a specific patch is outputted, and images of yellow, magenta, cyan and black are formed on a transfer sheet by the image forming method of the aforementioned image forming system B. After that, the image of the specific patch is read by the aforementioned image reading system A; and the positional slip of each color is detected and operations are conducted so that the positional slip can be corrected by the mirrors 245, 255, 265, 275 of the laser writing units 324-327.

This correction is conducted as follows.

(i) The scanning lines of the primary scanning conducted by each laser writing unit are made parallel to each other; in other words, the writing-in is made parallel.

(ii) The interval between the laser writing system units are made appropriate, in other words, the interval in the auxiliary direction is corrected.

(iii) The scanning width of the primary scanning conducted by each laser writing system unit is made constant.

(iv) The position from which writing of primary scanning of each laser writing system unit starts, is adjusted to a predetermined position, in other words; the slip in the primary scanning direction is corrected.

First, color image formation of a specific patch will be explained as follows.

Figure 9:
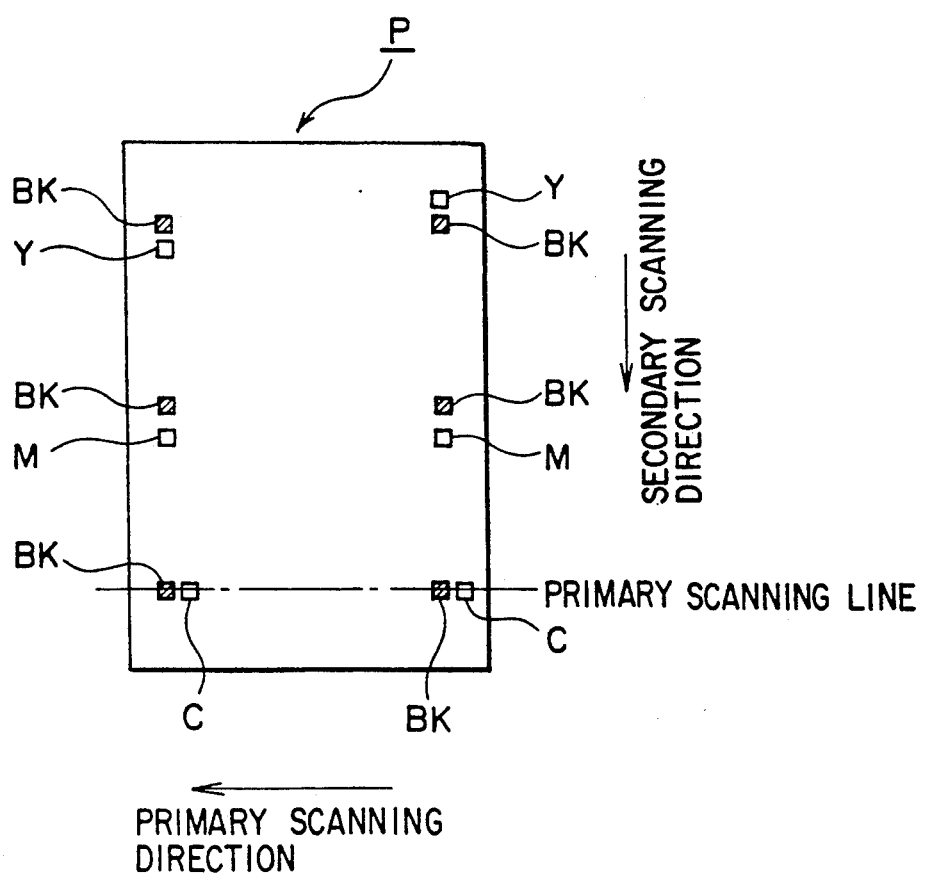
FIG. 9 is a view showing a pair of patches on a recording paper made by a position adjusting mode.

One of the colors of yellow, magenta, cyan and black is selected so that it can be used for a reference color. Image formation is conducted while the patch of the reference color is located in both ends of a primary scanning line. At the same time, the patches of other colors are formed in both ends of the same primary scanning line as that of the reference patch. In other words, the patch of the reference color and that of other color are formed in both ends of the same scanning line on transfer sheet P in such a manner that they form a pair of patches. As illustrated in FIG. 9, in this embodiment, a black patch is used for the reference. Black (BK) and yellow (Y), black (BK) and magenta (M), and black (BK) and cyan (C), are used for a pair of patches, and image formation is conducted on transfer paper P using the aforementioned pair of patches. If the positioning of the laser writing system units 324-327 has been conducted accurately, the patches perfectly overlap with each other. FIG. 9 shows a state in which a slip has occurred because of an incomplete positioning.

Image data is previously stored in a memory (not shown in the drawing) so that the patch images of the patch pairs can be formed in the same position with regard to the primary and auxiliary direction using the laser writing system units 324-327 before the positions are adjusted.

When the image of the specific patch is formed, the process is changed over from the normal mode of the aforementioned color image forming process to the position adjusting mode by pressing an operation adjusting button provided on a operation panel of the apparatus body (both of them are not shown in the drawing). In this position adjusting mode, a patch image is called from the patch memory, and image formation is conducted by the aforementioned normal color image forming method.

When a copying button (not shown in the drawing) provided on the operation panel has been pressed, the operation of patch image formation starts, and then the patch pair is formed on a recording paper as illustrated in FIG. 9.

Then, transfer sheet P, on which the color image of the aforementioned pair of patches have been drawn, is placed on a platen 311. When the copying button on the operation panel is pressed again, the aforementioned transfer paper P is illuminated with a halogen lamp 121, and image data of the formed image is read out by a reading section 314. As illustrated in FIG. 6, the read-out data is processed by means of A/D-conversion, complimentary color conversion, black component extraction and color correction. Position adjusting is conducted according to the image signal obtained in the aforementioned manner. When 100% UCR is conducted, the components of Y, M, C and Bk can be separated, in other words, each patch can be separated Namely, the read-out image signal is inputted into a patch pair detecting section 351 according to the position adjusting mode, and the patch pairs of BK and Y, BK and M, and BK and C are identified so that the positional relation can be detected. The amount of slip of the position of each patch pair is computed in a operation section 352 from the positional relation between the patch of each color identified by the patch pair detecting section 351 and the reference patch. The aforementioned amount of slip is stored in slip memory sections 353a-353c. According to the amount of slip, the amount of correction is found from ROM353a by means of the look-up table system, and the positions of the laser writing system units are adjusted by CPUs 353 and 355. The slip of the position can be classified as follows:

(1) The distance between the patch located in the end and the reference patch varies. (The lines connecting the patches are not in parallel with each other.) This case is shown by the upper patch pair in FIG. 9.

(2) A patch pair slips in the auxiliary scanning direction, which is shown by the patch pair in the middle of FIG. 9.

(3) The length (the width of the primary scanning) of a patch pair in the primary scanning direction varies.

(4) A patch pair slips in the primary scanning direction, which is shown by the lower patch pair in FIG. 9.

When the slips of the position described in the above (1)-(4) are corrected, the corrections of the aforementioned (i)-(iv) can be conducted.

This patch pair detecting section 351 will be explained as follows.

The detection of positional slip and positional correction are conducted in the same manner in any patch pairs of BK and Y, BK and M, and BK and C. Accordingly, in the following emodiment, only the patch pair of BK and Y is explained in detail.

Figure 10A:
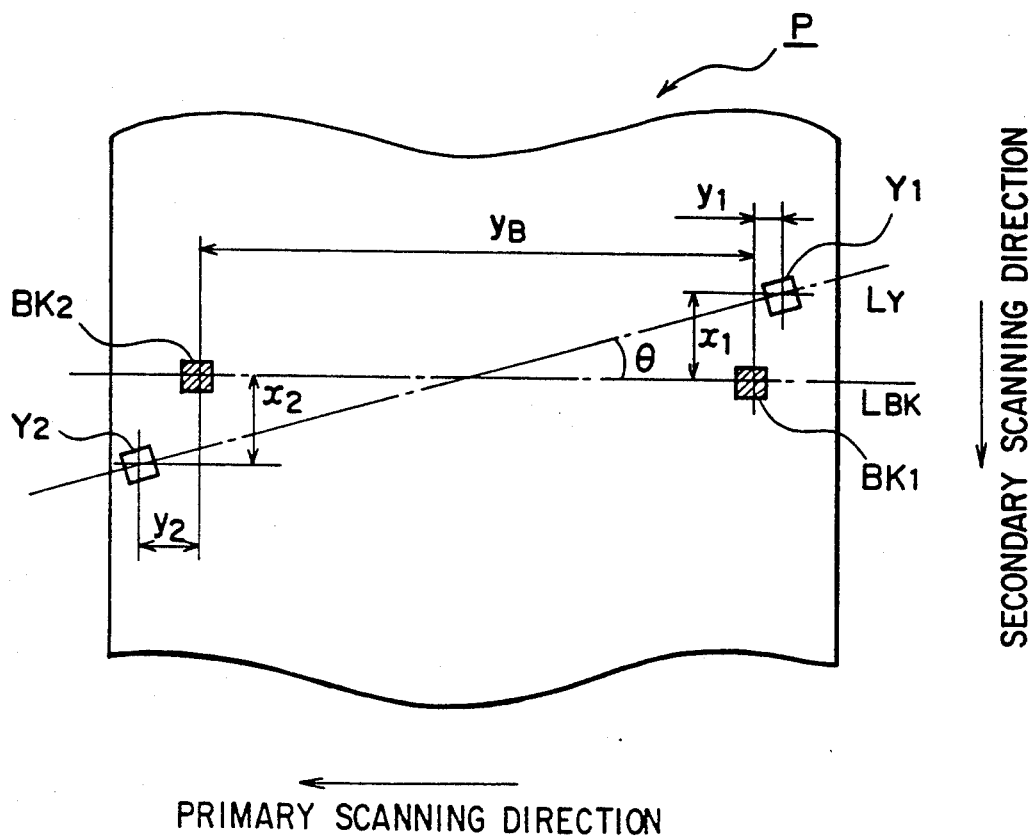
FIGS. 10(a) through 10(d) are alternate views showing the positional relation between the patch of Bk which is a reference patch and the patch of yellow.

FIG. 10(a) shows a case in which all the positional slips of the aforementioned (1)-(4) occur in a patch pair made by the aforementioned position adjusting mode. A BK patch on the upstream side of the primary scanning direction is defined as $BK_1$, and a BK patch on the downstream side of the primary scanning direction is defined as $BK_2$. In the same manner, a Y patch on the upstream side of the primary scanning direction is defined as $Y_1$, and a Y patch on the downstream side of the primary scanning direction is defined as $Y_2$.

In the patch pair detecting section 351, the patch pair on transfer sheet P shown in FIGS. 10(a)-10(d) is identified according to the image signal which has been processed by an image processing means 350, and at the same time, the following positional relations are detected.

$x_1$: A distance in the auxiliary scanning direction from $BK_1$ to $Y_1$ $x_2$: A distance in the auxiliary scanning direction from $BK_2$ to $Y_2$ $y_1$: A distance in the primary scanning direction from $BK_1$ to $Y_1$ $y_2$: A distance in the primary scanning direction from $BK_2$ to $Y_2$ $Y_B$: A distance from $BK_1$ to $BK_2$ Suppose that: concerning $x_1$ and $x_2$, when they are located on the upstream side of $BK_1$ and $BK_2$ with regard to the auxiliary scanning direction, they are negative; and when they are located on the downstream side, they are positive. In the same manner as described above, suppose that: concerning $y_1$ and $y_2$, when they are located on the upstream side of $BK_1$ and $BK_2$ with regard to the primary scanning direction, they are negative; and when they are located on the downstream side, they are positive.

Next, the positional slip operating section 352 will be explained.

In the positional slip operating section 352, angle $\theta$ is computed from the value detected by the aforementioned patch pair detecting section 352, wherein angle $\theta$ is formed by primary scanning line $L_{BK}$ of BK connecting $BK_1$ with $BK_2$ and primary scanning line $L_Y$ of Y connecting $Y_1$ with $Y_2$.

Figure 10B:
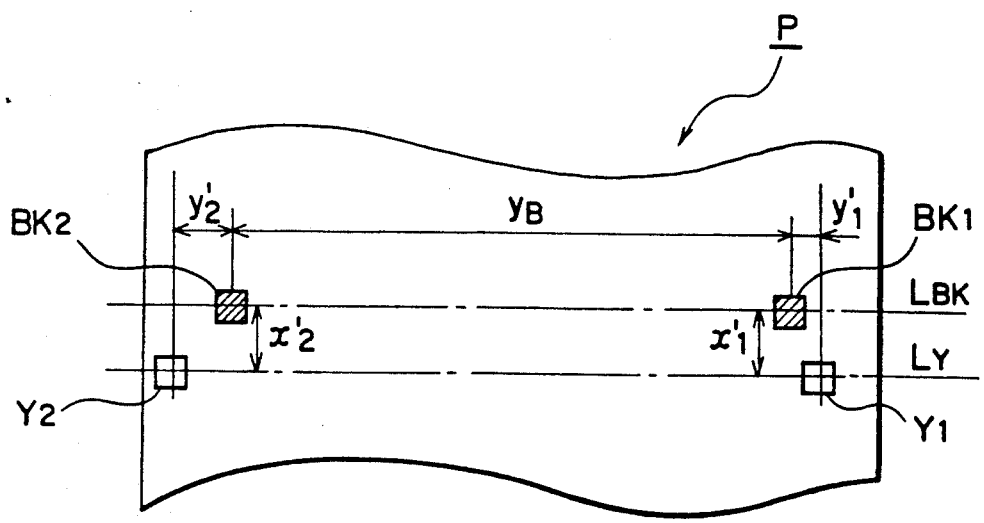

On the assumption that patch pair $L_{Bk}$ and $L_Y$ are in parallel (in other words, $\theta=0$) with each other as illustrated in FIG. 10(b), the following are computed: distance $x_1'$ ($=x_2'$) between $L_{BK}$ and $L_Y$ in the direction of auxiliary scanning; distance $y_1'$ in the direction of primary scanning between $Bk_1$ and $Y_1$; and distance $y_2'$ in the direction of primary scanning between $Bk_2$ and $Y_2$.

Further, on the assumption that: patch pair $L_{Bk}$ and $L_Y$ are in parallel (in other words, $\theta=0$) with each other, and that the distance between $Y_1$ and $Y_2$ is the same as that between $BK_1$ and $BK_2$ as illustrated in FIG. 10(b), distance $y_1''$ in the primary direction between $BK_1$ and $Y_1$, and distance $y_2''$ ($=y_1''$) in the primary scanning direction between $BK_2$ and $Y_2$ are computed.

Values of $x_1$, $x_2$, $y_1$, $y_2$, and $y_B$ which have been detected in the aforementioned patch pair detecting section 351, and $\theta$, $x_1'$ ($=x_2'$), $y_1'$, $y_2'$, and $y_1''$ ($=y_2''$) which have been found by the operation in the positional slip operating section 352, are corrected using the table values in ROM353a, with regard to the motor operation which will be described later, and the corrected values are inputted into CPUs 353, 355 which will be described later. CPUs 353, 355 conduct the adjustment (correction) of the aforementioned (i)-(iv) in accordance with the amount of slip which has been inputted from the aforementioned pair patch detecting section 351 and the the positional slip operating section 352.

The positional adjustment (correction) (i) and (ii) in this embodiment are performed by moving the mirrors 245, 255, 265, 275 of the laser writing units 324-327.

Figure 11:
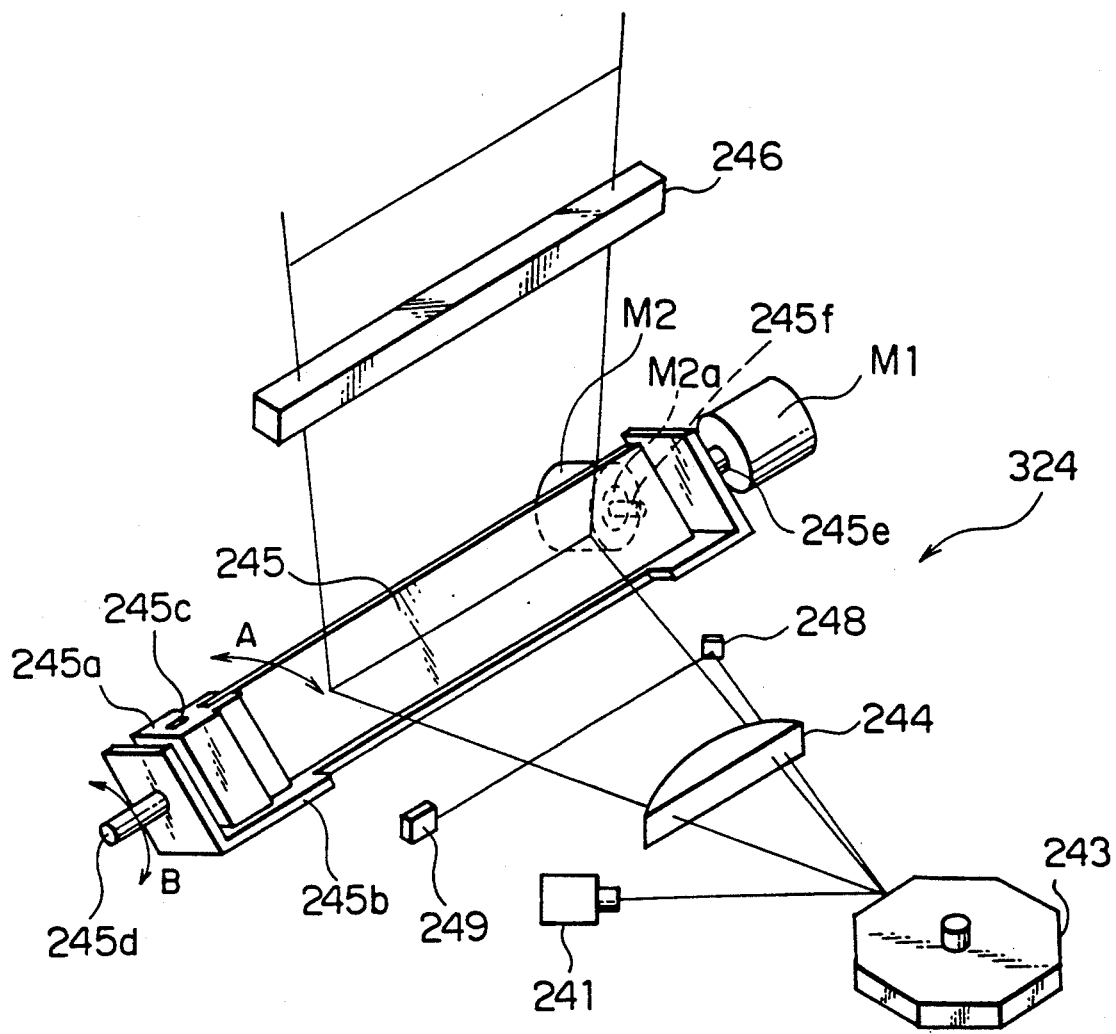
FIG. 11 is a view showing the laser writing unit of yellow.

Referring to FIG. 11, the composition of the laser writing units 324, 325, 326, 327 will be explained as follows.

The laser writing units 324, 325, 326, 327 have the same structure and function, so that the laser writing system unit 324 corresponding to a yellow image will be explained here.

An image signal is inputted into the laser writing system unit 324, and the laser beam generated by a semiconductor laser 241 is scanned by a rotating polygonal mirror 243, and passes through an f-$\theta$ lens 244, mirror 245, cylindrical lens 246, and an image is formed on a photoreceptor belt 315. A beam detector 249 detects a laser beam generated by the laser semiconductor 241, through a mirror 248.

Figure 12:
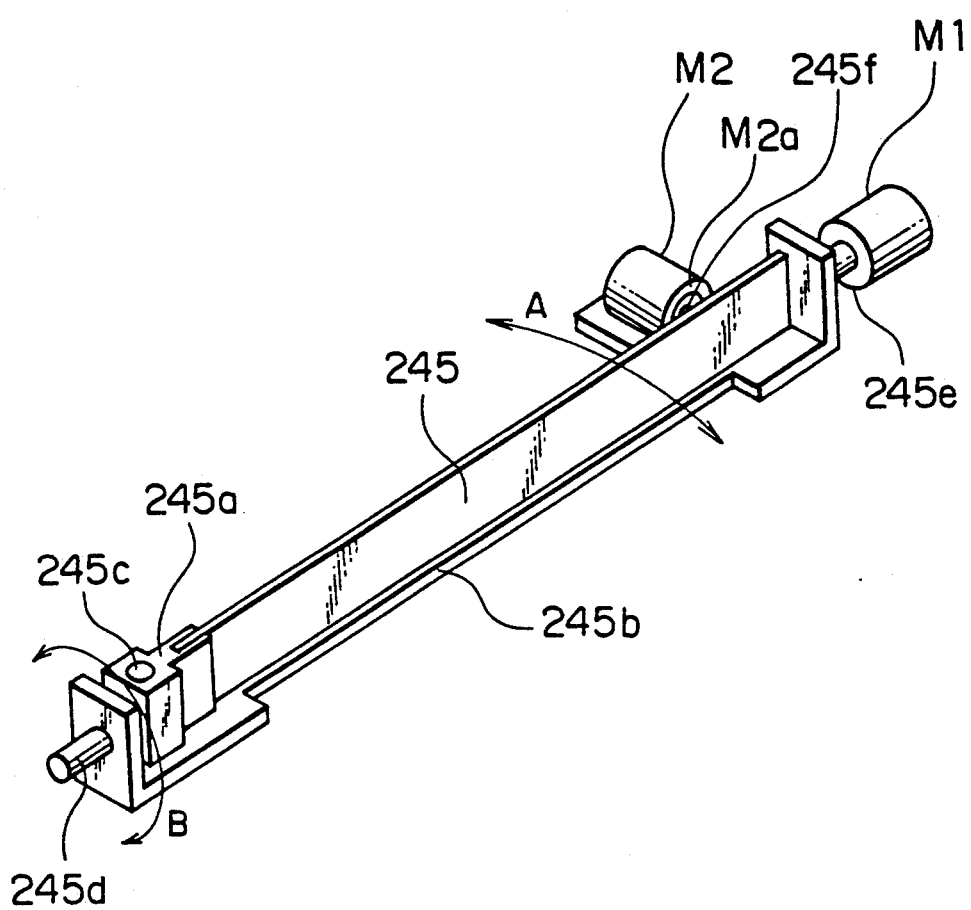
FIG. 12 is a perspective view showing the mirror of the laser writing unit.
Figure 13:
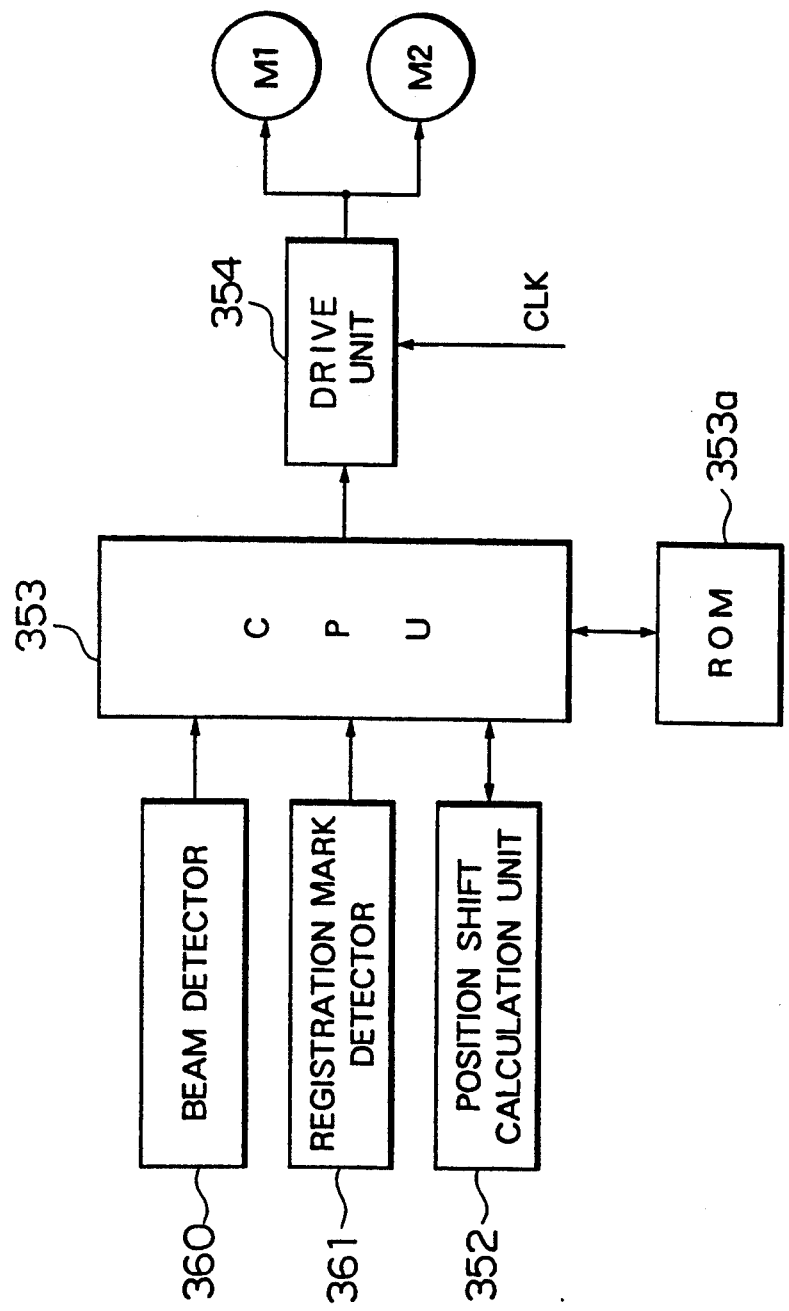
FIG. 13 is a block diagram used for adjusting the slippage between the parallelism of the scanning line and the direction of sub-scanning.

Referring to FIG. 11 and FIG. 12, the mirror 245 will be explained in detail.

One end of the mirror 245 is supported by a holding member 245a so that the mirror 245 and the holding member 245a are integrated into one body. The holding member 245a is provided on a support member 245b, and the support member 245b is rotatably supported by s rotating shaft 245d, so that the holding member 245a can be rotated together with the mirror 245 One end of the support member 245b is rotatably supported by a bearing (not shown in the drawing) through a supporting shaft 245d, and the other end of the support member 245b is supported by a shaft 245e of motor M1 which is a pulse motor.

A shaft 245f of motor M2, which is a pulse motor, is fixed to the reverse side of the mirror 245, and the shaft 245f around which a male screw is formed, is moved in the axial direction when a rotor M2a of motor M2 in which a female screw is formed, is rotated. Motor M2 is provided to the support member 245b, and the support member 245b is rotatably supported by the supporting shaft 245d and a shaft 245e of motor M1, so that the support member 245b can be integrally rotated by motor M2. Accordingly, when motor M1 is rotated, the mirror 254 can be rotated in the direction of B around the supporting shaft 245d and the shaft 245e of motor M1, and when motor M2 is rotated, the mirror 245 can be rotated in the direction of A around a rotating shaft 245c. These motors M1 and M2 are rotated by a drive section 354 controlled by CPU353 according to pixel clock CLK, which will be described later, so that the slip can be corrected.

First, adjustment of parallelism (i) will be explained, wherein the adjustment is conducted in order to make the scanning lines of the primary direction parallel.

In order to make $L_{Bk}$ and $L_Y$ parallel, CPU353 may control the value of $\theta$ so that $\theta$ can be 0 according to the operation conducted in the positional slip operating section 352. CPU353 can make the angle $\theta$ formed by $L_{Bk}$ and $L_Y$ to be 0 in such a manner that: CPU353 sends a signal to the drive section 354 so that rotor M2a of motor M2 shown in FIG. 11 and FIG. 12 can be rotated and the mirror 245 can be rotated in the direction of A around the rotating shaft 245c. At this time, the amount of rotation of the mirror 245 can be finely adjusted when the amount of rotation of rotor M2a is controlled with pixel clock CLK in accordance with angle $\theta$ which is formed by $L_{Bk}$ and $L_Y$. As a result, parallelism of the scanning line in the primary scanning direction conducted by the laser writing system unit can be maintained within the range of one scanning. (Refer to FIG. 10(b)).

Then, (ii) adjustment of slip in the auxiliary scanning direction will be explained, wherein the adjustment of slip is to properly correct the interval between the laser writing system units.

Figure 10C:
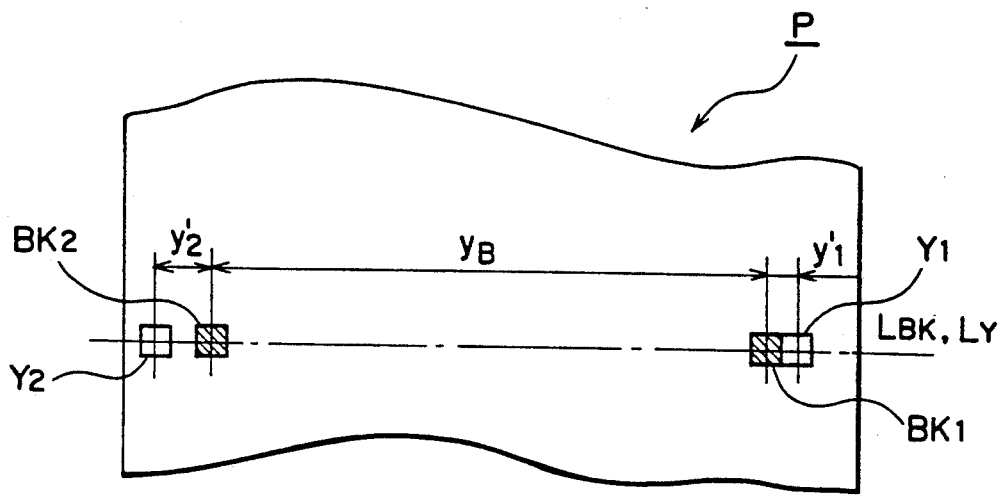
Figure 10D:
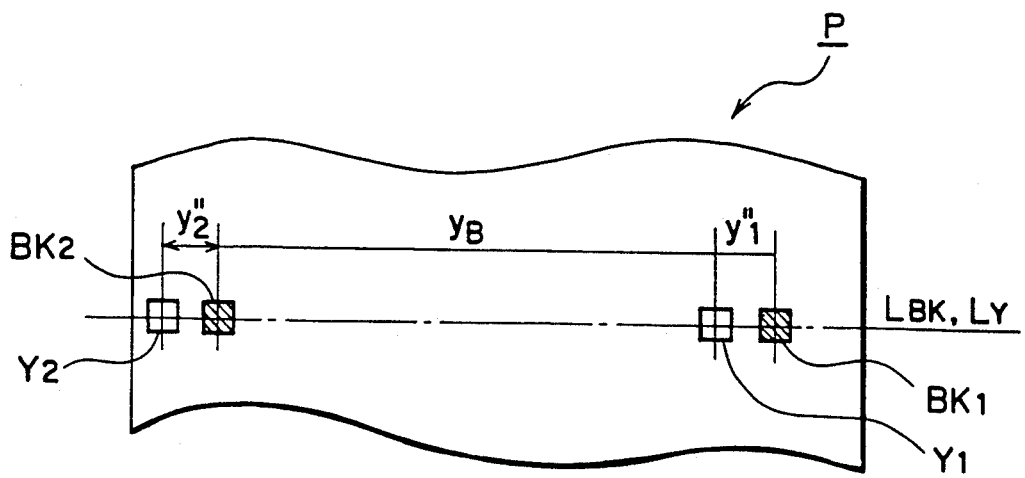

In the case of pair patches shown in FIGS. 10(b)-10(d), in order to overlap $L_{Bk}$ with $L_Y$, it is necessary to move $L_Y$ to the upstream side of the auxiliary scanning direction. In order to move $L_Y$, the drive section 354 is controlled by the CPU 353, and motor M1 shown in FIG. 11 and FIG. 12 is driven so that $L_Y$ can be moved. Namely, when motor M1 is rotated, the mirror 245 is rotated around the support shaft 245d and the shaft 245e so that $L_Y$ can be overlapped with $L_{Bk}$, in other words, the slip in the auxiliary direction can be corrected. The amount of slip in the auxiliary direction is $x_1'$ which has been computed in the operating section 352. At this time, the amount of motor M1 rotation can be finely adjusted by controlling with pixel clock CLK in accordance with the amount of slip $x_1'$.

Figure 14:
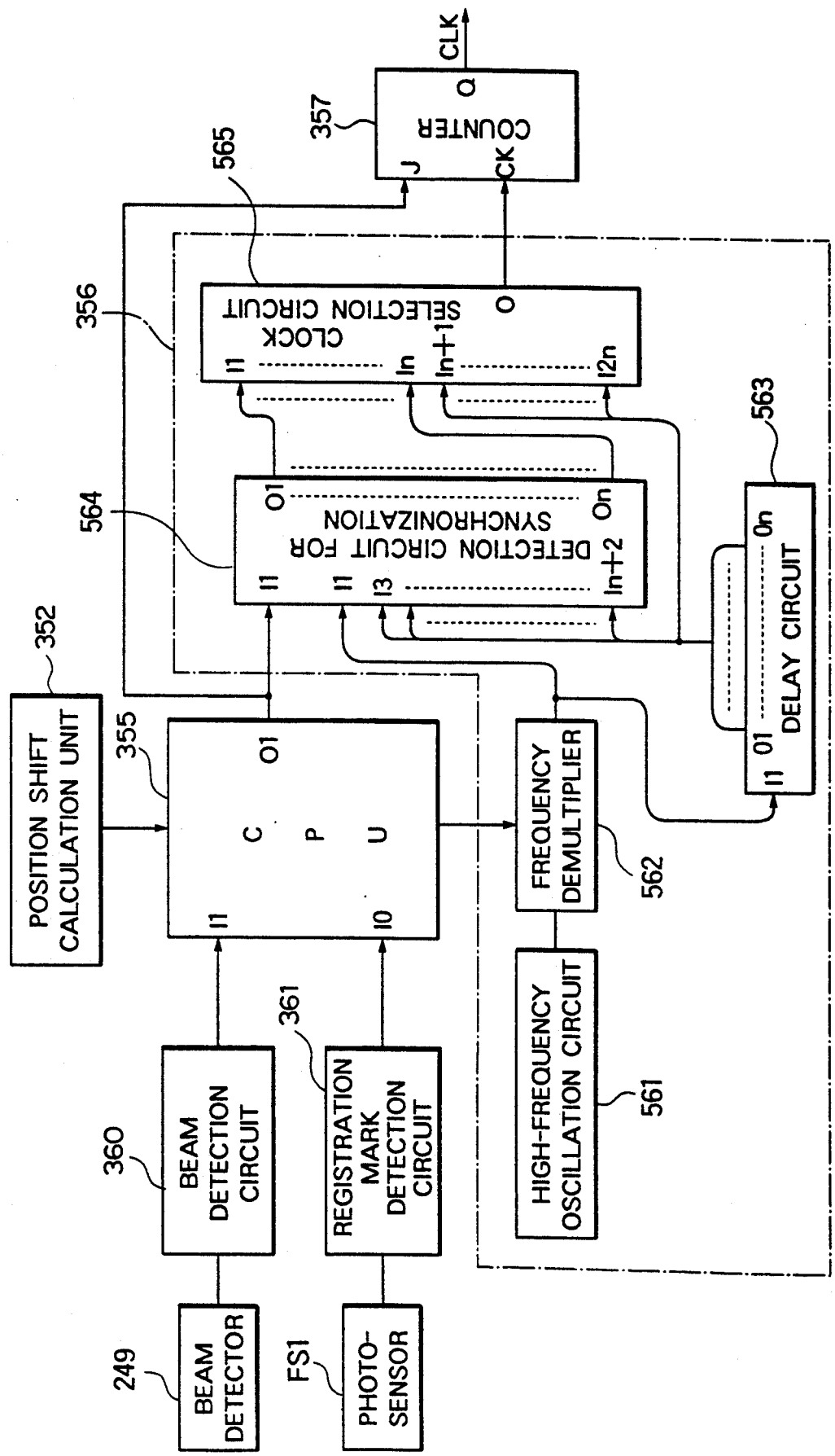
FIG. 14 is a block diagram used for adjusting the width and slippage of primary scanning.

In order to conduct the positional adjustments of (iii) and (iv) in this embodiment, a beam detection circuit 360, a registration mark detection 361, a CPU 355, a clock synchronizing circuit 356 and a counter 357 are utilized which are shown in FIG. 14.

As illustrated in FIG. 14, the beam detection circuit 360 outputs a rectangular beam detection signal BD according to an output signal sent from a beam detector 249 which receives a laser beam through a mirror 248, on the basis of an optional setting value.

The registration mark detection circuit 361 outputs a rectangular registration signal RL in accordance with the peak value of an output signal of photo-sensor FS1 generated by light transmitted through the registration mark in the optical scanning, or in accordance with an optional setting value. It is not necessary to conduct an optical scanning by a laser beam in order to detect the registration mark 152, all over the region. The aforementioned optical scanning may be limited to a region including a registration mark 152 according to the detection of the reference mark and the detection of a belt position conducted by an encoder. The CPU355 outputs an image signal referring to beam detection signal BD and registration signal RL, and at the same time, corrects the slips according to the slips $y_1'$, $y_2'$ of the primary scanning width and the slips $y_1''$, $y_2''$ of the primary scanning direction which are computed in the positional slip operating section 352.

The clock synchronizing circuit 356 outputs a pixel clock synchronizing with an output signal from the CPU355. The clock synchronizing circuit 356 is composed of; an oscillation circuit 561 which generates a reference pixel clock; a frequency demultiplier which adjusts the frequency of the reference pixel clock; a delay circuit 563 which generates multi-phases by delaying the phase of the reference clock; a detection circuit for synchronization 564 which detects a clock most synchronizing with the phase of the output signal of the CPU355; a clock selection circuit 565 which selects an output signal between the output signal of the detection circuit 564 for synchronization and the output signal of the delay circuit 563; and a counter 357 which outputs an output signal from the CPU355 and pixel clock CLK from the clock selection circuit 565 according to the output signal of the CPU355. Namely, the counter 357 outputs clock CLK from when the output signal has been inputted from the CPU355 over a predetermined period of time which corresponds to the primary scanning width. The image signal is outputted according to this pixel clock CLK. First, the adjustment of the primary scanning width (iii) will be explained as follows, wherein the aforementioned adjustment is a correction to make the primary scanning width of the laser writing system unit constant.

This adjustment of the primary scanning width of the primary scanning direction is conducted in order to make the distance between $Y_1$ and $Y_2$ in the primary scanning direction equal to the distance between $BK_1$ and $BK_2$ in the primary direction in such a manner that: when $y_1'-y_2'<0$ (when the distance between $Y_1$ and $Y_2$ is longer than the distance between $BK_1$ and $BK_2$), wherein $y_1'$ and $y_2'$ are computed in the positional slip operating section 353, the dot-clock of the writing system is advanced; and on the contrary, when $y_1'-y_2'>0$ (when the distance between $Y_1$ and $Y_2$ is shorter than the distance between $BK_1$ and $BK_2$), the pixel clock of the writing system is delayed.

The high frequency oscillation circuit 561 provided in the clock synchronizing circuit 356 is a clock of high frequency, and for example, a reference pixel clock is oscillated by a high frequency oscillating circuit. When the dividing ratio of the frequency demultiplier 562 is changed, the frequency of the reference pixel clock of the high frequency oscillation circuit 561 can be changed.

This dividing ratio is set so that $(y_1')-(y_2')=0$ in the CPU355, wherein $y_1'$ and $y_2'$ computed in the aforementioned positional slip computing section 352 are utilized in this process.

Namely, when the frequency of the reference pixel clock given to each laser beam is changed, the reference pixel clock can be advanced or delayed. Accordingly, when the frequency is changed, the distance between $Y_1$ and $Y_2$ of the primary scanning direction can be made equal to the distance between $BK_1$ and $BK_2$ of the primary scanning direction.

Next, (iv) the adjustment of the primary scanning direction will be explained as follows, wherein the aforementioned adjustment is to correct the starting position of writing of the primary scanning direction of each laser writing system unit.

Time $t_i$ from when beam detection signal BD was detected to when registration signal RL has been detected, is measured by a plurality of times, and the averaged value $t_a$ is stored in the register, wherein i=1, 2, 3, .... Slip time $t_r$ is computed from slip $y_1''$ of the primary scanning direction which has been found in the positional slip operating section 352 on the basis of the scanning speed of the laser writing system unit 324, and the computed slip time $t_r$ is stored. When the value of slip $y_1''$ is positive, the value of slip time $t_r$ is positive, and when $y_1''$ is negative, $t_r$ is negative. After a new beam detection signal BD has been detected by the aforementioned CPU355, an output signal is outputted being delayed by the time of $t_a+t_r$, wherein $t_a$ is the aforementioned average time and $t_r$ is the stored slip time. In the manner described above, the slip in the primary scanning direction can be adjusted (corrected).

As explained above, in the positional adjusting mode, the aforementioned adjustments (corrections) (i)-(iv) can be conducted to correct the aforementioned positional slips (1)-(4).

Namely, the positions of the laser writing units of yellow, magenta and cyan are accurately adjusted with regard to the laser writing unit of black which is used for a reference, so that a color slip is not caused in the color image formed on a recording paper.

After the aforementioned positional adjustment has been completed, the positional adjusting button on the operation panel is pressed again so that the positional adjusting mode can be released and image formation is conducted according to a usual image forming mode.

In this embodiment, the laser writing unit of black is used for the reference. However, it should be understood that the present invention is not limited to the laser writing unit of black, and either of the laser writing units of yellow, magenta and cyan can be used for the reference. The position of the laser writing unit to be used for the reference may be adjusted by an operator.

The aforementioned positional adjustment need be conducted only once. However, when the positional adjustment is conducted a plurality of times, the positional adjustment can be conducted more accurately.

In this embodiment, patches are made on both sides of a scanning line. However, the patches are not necessarily made on both sides. As far a positional slip between the patch and the reference patch can be detected, the patch may be made in either position. The positional slip may be detected by the formation of a line instead of a patch.

In this embodiment, the image of a patch pair is read out by image reading system A provided in the apparatus body. However, the image of a patch pair may be read out by another image reading system different from image reading system A. In this embodiment, each patch pair is formed on a transfer sheet in the image adjusting mode. However, the toner image of a patch pair formed on a photoreceptor belt may be directly read out by a reading-out means provided around the periphery of the photoreceptor belt so that the position of the patch pair can be detected.

As explained above, the color image forming apparatus of the present invention can provide the following effects: The composition of image forming means such as an image forming body, a charging unit, a developing unit and an optical laser unit for image exposure, is quite new, so that the size of the apparatus can be made small and compact and a color image can be formed as quickly as a black and white image. The aforementioned optical laser system is precisely positioned, so that the accuracy of color image registration is high and a color image of high resolution can be stably formed. Further, when the parts of the aforementioned optical laser system are replaced, the work can be accurately and easily conducted without adjusting the position of each optical laser unit and the parallelism and amplitude of exposure beams.

The color image forming apparatus of the present invention in which image forming means including a plurality of exposure units are provided around a moving image forming body, comprises: a detection means which detects a specific pattern outputted by the aforementioned exposure unit; an operation means which computes a positional slip of a specific pattern between the exposure units; and a control means which controls the position of the aforementioned exposure unit according to the positional slip computed by the aforementioned operation means so that a color slip can be prevented.

The present invention is to provide a color image forming apparatus characterized in that: the position of a plurality of exposure units are corrected so that the parallelism can be maintained; and when a latent image formation is repeatedly conducted in accordance with the number of colors while the slip of image in the direction of the primary scanning is corrected, the slip of the starting point of exposure from which a latent image is formed, can be prevented, so that the slip of a color can be prevented with such a high accuracy as a one scanning width of one dot width.

What is claimed is:
1. A color image forming apparatus comprising:
   (a) an image forming means including a moving image carrying member on which an image is formed, and a plurality of exposure means disposed around said moving image carrying member, each of said plurality of exposure means adapted for forming exposures for developing a corresponding color toner;
   (b) detecting means having a color separation function for detecting a plurality of specific image patterns formed through the exposures from each of said plurality of exposure means and the development of the color toner corresponding with each of the exposures;
   (c) means for calculating positional differences between the exposures formed by each of said plurality of exposure means by determining positional differences between the plurality of specific image patterns detected by said detecting means; and
   (d) means for compensating positions of said plurality of exposure means, based on the calculated positional differences.

2. The apparatus of claim 1, wherein said detecting means includes an image reading means.

3. The apparatus of claim 1 further comprising a common support surface on which said plurality of exposure means are disposed, said common support surface being formed in a step-like configuration.

4. The apparatus of claim 3, wherein said plurality of exposure means and said common support surface are integrated into a single optical unit which is detachable from the apparatus.

5. The apparatus of claim 4, wherein said optical unit is removable from and insertable into the side of the apparatus, and further wherein the apparatus includes guides and a stopper for properly positioning said optical unit.

6. The apparatus of claim 3, wherein a photosensitive surface of said moving image carrying member is disposed at an angle of between 5 degrees and 30 degrees relative said plurality of exposure means.

* * * * *

UNITED STATES PATENT AND TRADEMARK OFFICE
CERTIFICATE OF CORRECTION

PATENT NO. : 5,257,037
DATED : October 26, 1993
INVENTOR(S) : Satoshi Haneda et al.

It is certified that error appears in the above-indentified patent and that said Letters Patent is hereby corrected as shown below:

Title page, Abstract, line 5, after "surfaces" insert --disposed-- and line 6, delete "disposed".

Signed and Sealed this

Twenty-third Day of August, 1994

Attest:

BRUCE LEHMAN

Attesting Officer

Commissioner of Patents and Trademarks